(12) United States Patent
Kida et al.

(10) Patent No.: US 11,163,913 B2
(45) Date of Patent: Nov. 2, 2021

(54) TECHNOLOGIES FOR FILTERING MEMORY ACCESS TRANSACTIONS RECEIVED FROM ONE OR MORE I/O DEVICES

(71) Applicant: Intel Corporation, Santa Clara, CA (US)

(72) Inventors: Luis Kida, Beaverton, OR (US); Krystof Zmudzinski, Forest Grove, OR (US); Reshma Lal, Hillsboro, OR (US); Pradeep Pappachan, Hillsboro, OR (US); Abhishek Basak, Hillsboro, OR (US); Anna Trikalinou, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 235 days.

(21) Appl. No.: 16/234,871

(22) Filed: Dec. 28, 2018

(65) Prior Publication Data

US 2019/0138755 A1    May 9, 2019

(51) Int. Cl.
*G06F 21/78*    (2013.01)
*G06F 21/44*    (2013.01)
*G06F 21/85*    (2013.01)

(52) U.S. Cl.
CPC .............. *G06F 21/78* (2013.01); *G06F 21/44* (2013.01); *G06F 21/85* (2013.01)

(58) Field of Classification Search
CPC ...... G06F 21/78; G06F 21/44; G06F 12/1441; G06F 12/1475
See application file for complete search history.

(56) References Cited

U.S. PATENT DOCUMENTS

| | | | | |
|---|---|---|---|---|
| 7,716,389 B1 * | 5/2010 | Bruce | ..................... | G06F 13/28 710/22 |
| 2014/0201526 A1 * | 7/2014 | Burgess | ................... | H04L 12/12 713/165 |
| 2016/0132345 A1 * | 5/2016 | Bacher | .................... | G06F 9/542 718/1 |

* cited by examiner

*Primary Examiner* — Ellen Tran
(74) *Attorney, Agent, or Firm* — Jaffery Watson Mendonsa & Hamilton LLP

(57) ABSTRACT

Technologies for secure I/O include a compute device having a processor, a memory, an input/output (I/O) device, and a filter logic. The filter logic is configured to receive a first key identifier from the processor, wherein the first key identifier is indicative of a shared memory range includes a shared key identifier range to be used for untrusted I/O devices and receive a transaction from the I/O device, wherein the transaction includes a second key identifier and a trust device ID indicator associated with the I/O device. The filter logic is further configured to determine whether the transaction is asserted with the trust device ID indicator indicative of whether the I/O device is assigned to a trust domain and determine, in response to a determination that the transaction is not asserted with the trust device ID indicator, whether the second key identifier matches the first key identifier.

15 Claims, 4 Drawing Sheets

US 11,163,913 B2

TECHNOLOGIES FOR FILTERING MEMORY ACCESS TRANSACTIONS RECEIVED FROM ONE OR MORE I/O DEVICES

BACKGROUND

Trust domains provide isolation for virtual machines without including a virtual machine monitor (VMM) in a trusted code base (TCB) of the trust domain. Memory is protected using multi-key total memory encryption (MKTME). Each trust domain has its own Key ID used by MKTME to protect memory contents from other trust domains and the VMM. Hardware in a system-on-a-chip (SoC) enforces the protection. Generally, trust domain systems do not allow I/O devices to access trust domain-protected memory.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
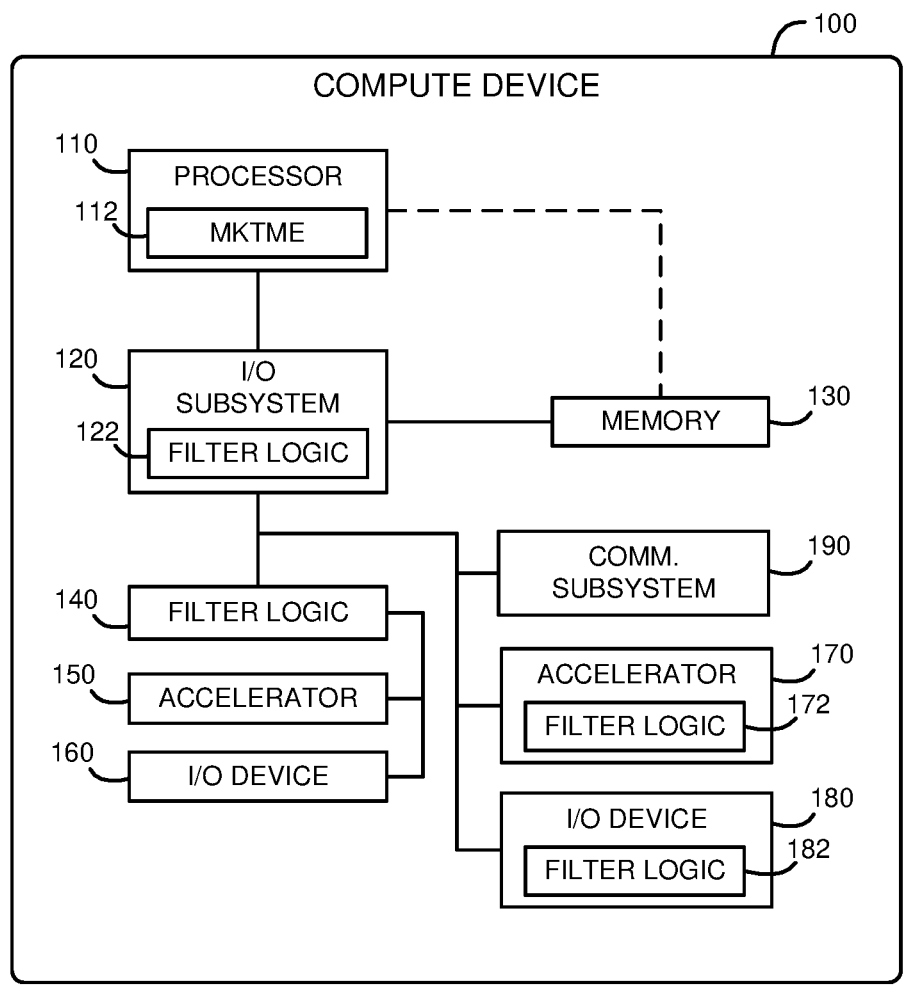
FIG. 1 is a simplified block diagram of at least one embodiment of a compute device having one or more filter logics for filtering direct memory access (DMA) transactions between one or more I/O devices and a trust domain.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative compute device 100 for filtering data transactions between a trust domain (TD) and an accelerator 150, 170 or other I/O devices 160, 180 is shown. In order to perform a secure I/O with the trust domain, the trust domain may authenticate an I/O device and determine a reliable device ID for the I/O device. The trust domain may program enforcement hardware (e.g., the IOMMU, root complex, or the device itself) with a binding between the trust domain and the device ID and memory access permissions for a trust domain memory. As such, when the I/O device generates direct memory access (DMA) transactions to access the trust domain memory, the enforcement hardware may enforce the binding between the trust domain and the device ID as well as the memory access permissions. If the transaction is allowed, the trust domain memory is accessed securely using multi-key total memory encryption (MKTME) support. It should be appreciated that a similar technique may be applied to other types of data transactions (e.g., memory-mapped I/O (MMIO) or cache access transactions) generated by the I/O device.

In use, as described further below, a filter logic 122, 140, 172, 182 may filter direct memory access (DMA) transactions received from one or more associated I/O devices (e.g., an accelerator 150, 170 or an I/O device 160, 180) to allow a transaction between a trust domain and an accelerator 150, 170 or other I/O devices 160, 180 or block any transaction that may be potentially malicious. To do so, the filter logic 122, 140, 172, 182 may be programmed by the trust domain with one or more private key identifiers (KIDs) of the trust domain for trusted I/O devices and a range of shared KIDs that may be used for untrusted I/O devices. Each DMA transaction generated by an I/O device may include a key identifier (KID) and a trust device ID (TID) indicator, which indicates whether the I/O device is assigned to the trust domain.

For example, when an accelerator 150, 170 generates a DMA transaction to access trust domain memory, the DMA transaction includes a KID and a TID indicator. In response to receiving the DMA transaction, the filter logic 122, 140, 172, 182 may determine whether the TID indicator (e.g., a TID flag) was asserted to determine whether the corresponding accelerator 150, 170 is a trusted I/O device to allow secure I/O with the trust domain. The TID indicator is a flag that may be asserted in the DMA transaction to indicate that the corresponding I/O device is assigned to the trust domain. In other words, the assertion of the TID indicator (i.e., the TID flag was set) indicates that the filter logic 122, 140, 172, 182 is programmed by the trust domain with one or more private key identifiers (KIDs) of the trust domain for trusted I/O devices. If the TID indicator was not asserted (i.e., the TID flag was not set), the filter logic 122, 140, 172, 182 may further determine whether the KID is within a shared KID range assigned by the trust domain to determine whether to allow I/O with a memory outside of the trust domain. Accordingly, the filter logic 122, 140, 172, 182 may filter data transactions generated by an accelerator or other I/O device to allow I/O with a trust domain memory, allow I/O with a memory outside of the trust domain, or block transactions as being potentially malicious, which may improve security and/or performance of the compute device 100. It should be appreciated that, although the trust domain is described as being a single trust domain throughout the present application, the filter logic 122, 140, 172, 182 may monitor and filter data transaction between one or more trust domains and an I/O device (e.g., an accelerator 150, 170 or other I/O device 160, 180). Additionally, it should be also appreciated that trusted devices may not be universally trusted by all trusted domains. In other words, one trusted device may be trusted by one trusted domain but not by another trusted domain. When multiple trust domains are involved, the filter logic 122, 140, 172, 182 may determine which trust domain's memory that a given I/O device is allowed to access based on an internal table, which may only be programmed by the trust domains.

The compute device 100 may be embodied as any type of device capable of performing the functions described herein. For example, the compute device 100 may be embodied as, without limitation, a computer, a laptop computer, a tablet computer, a notebook computer, a mobile compute device, a smartphone, a wearable compute device, a multiprocessor system, a server, a workstation, a distributed compute device, a disaggregated compute device, and/or a consumer electronic device. As shown in FIG. 1, the illustrative compute device 100 includes a processor 110, an I/O subsystem 120, a memory 130, a communication subsystem 190, one or more accelerators 150, 170, one or more I/O devices 160, 180, and a filter logic 122, 140, 172, 182. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. For example, the processor 110 may be embodied as a single or multi-core processor(s), digital signal processor, microcontroller, or other processor or processing/controlling circuit. As shown, the processor 110 illustratively includes multi-key total memory encryption (MKTME) support 112. The MKTME 112 may encrypt data that is transmitted to the memory 130 for storage and decrypt encrypted data retrieved from the memory 130.

The MKTME support 112 allows the processor 110 to transparently encrypt the contents of the memory 130. The MKTME support 112 maintains a table or other internal, protected structure with multiple encryption keys, which are used to encrypt and decrypt data as it is stored to and read from the memory 130, respectively. The encryption keys are illustratively 128-bit AES XTS keys although may be embodied as any symmetric, asymmetric, or other encryption key. The encryption key may be selected by the MKTME support 112 on a per-page basis, for example based on a key identifier included in one or more otherwise unused upper bits of the physical memory page address for a particular memory access. In those embodiments, an operating system, virtual memory monitor, or other supervisory component of the compute device 100 may control access to particular memory pages by configuring one or more page tables and/or extended page tables with the appropriate key identifiers. MKTME keys may be generated by the MKTME support 112, in which case they are not disclosed outside of the processor 110, or may be supplied by software. In some embodiments, the MKTME support 112 may include support for Intel Trusted Domain Extensions (TDX). With TDX, the MKTME support 112 may accept an external "domain" key, also called a "user" or "tenant" key. The processor 110 may also use a default key that is self-generated to protect memory used by MKTME and Intel SGX as well as Intel TDX.

The memory 130 may be embodied as any type of volatile or non-volatile memory or data storage capable of performing the functions described herein. In operation, the memory 130 may store various data and software used during operation of the compute device 100 such as operating systems, applications, programs, libraries, and drivers. As described above, in some embodiments, part or all of the contents of the memory 130 may be encrypted or otherwise protected from unauthorized disclosure using the MKTME support 112 of the processor 110. Illustratively, the memory 130 is communicatively coupled to the processor 110 via the I/O subsystem 120, which may be embodied as circuitry and/or components to facilitate input/output operations with the processor 110, the memory 130, and other components of the compute device 100.

For example, the I/O subsystem 120 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 130 may be directly coupled to the processor 110, for example via an integrated memory controller hub or a data port. The I/O subsystem 120 may further include a sideband network, secure fabric, or other secure routing support. The secure routing support may include hardware support to ensure I/O data cannot be misrouted in the I/O subsystem 120 under the influence of rogue software. Additionally, in some embodiments, the I/O subsystem 120 may form a portion of a system-on-a-chip (SoC) and be incorporated, along with the processor 110, the memory 130, and other components of the compute device 100, on a single integrated circuit chip. The compute device 100 may include a data storage device (not shown), which may be embodied as any type of device or devices configured for short-term or long-term storage of data such as, for example, memory devices and circuits, memory cards, hard disk drives, solid-state drives, non-volatile flash memory, or other data storage devices.

The accelerator 150, 170 may be embodied as any coprocessor, field-programmable gate array (FPGA), application-specific integrated circuit (ASIC), or other hardware- or software-based accelerator that is capable of performing accelerated processing for the compute device 100. The accelerator 150, 170 may access large amounts of memory stored in the memory 130 via the I/O subsystem 120. In some embodiments, the accelerator 150, 170 may include a cache or other local memory other than the main memory 130. It should be appreciated that, although the compute device 100 depicted in FIG. 1 includes one accelerator 150 and one accelerator 170 with a filter logic, the compute device may include any given number of accelerator(s) 150 and 170. For example, in some embodiments, the compute device 100 may include one or more accelerator 150 and/or one or more accelerator 170.

The I/O device 160, 180 may be embodied as an accelerator 150, 170, a peripheral device (not shown), and/or or other I/O device of the compute device 100. For example, in some embodiments, the peripheral devices may include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices. It should be appreciated that, although the compute device 100 depicted in FIG. 1 includes one I/O device 160 and one I/O device 180 with a filter logic, the compute device may include any given number of I/O device(s) 160 and 180. For example, in some embodiments, the compute device 100 may include one or more I/O device 160 and/or one or more I/O device 180.

As shown, the compute device 100 further includes a filter logic 122, 140, 172, 182. The filter logic 122, 140, 172, 182 may be embodied as any hardware controller(s), component(s), or other circuitry capable of performing the functions described herein. In particular, the filter logic 122, 140, 172, 182 may filter I/O transactions as described further below. It should be appreciated that the filter logic may be incorporated in an I/O device itself. For example, the filter logic 172 and the filter logic 182 are incorporated in the accelerator 170 and the I/O device 180, respectively. In such embodiments, the I/O device 170, 180 with the filter logic 172, 182 may use an authentication scheme similar to the PCIe-Sig standard for Universal Serial Bus (USB) device authentication to attest itself as a trusted I/O device to the trust domain. It should be appreciated that the filter logic 172, 182 is configured to filter data transactions generated by the associated I/O device (e.g., an accelerator 170 or an I/O device 180). Additionally or alternatively, in some embodiments, the filter logic may be incorporated along the I/O path from the I/O device to a single integrated circuit chip. For example, as illustrated in FIG. 1, the filter logic 140 is incorporated along the I/O path to a single integrated circuit chip that may include the processor 110, the I/O subsystem 120, and the memory 130. It should be appreciated that the filter logic 140 is configured to filter data transactions generated by one or more accelerators or I/O devices of the compute device 100.

Additionally or alternatively, in other embodiments, the filter logic may form a portion of a processor 110 or an integrated circuit chip (e.g., a root complex or other system-on-a-chip (SoC) component). For example, the filter logic 122 is incorporated in the I/O subsystem 120 as a portion of a SoC. In such embodiments, the root complex or other system-on-a-chip (SoC) component may include one or more ports, such as PCI express ports, IAL ports, or other ports. Each port may be coupled to one or more accelerators and/or other I/O devices, and the filter logic 122 may be incorporated in each ports to filter transactions generated by one or more accelerators or I/O devices coupled to that port. In some embodiments, filtering may be performed for Intel Accelerator Link (IAL) devices, including secure use of IAL.mem and IAL.cache. In such embodiments, the filter logic is included in a SoC's control module, MS2IAL, for cache accesses. This filter logic may be programmed statically by a trusted agent during boot. As described further below, the filter logic may drop all cache accesses where the KID of a DMA transaction falls within the private KID reserved for trust domains. Alternatively, the MS2IAL module may be programmed dynamically after boot. MS2IAL will allow only those trust domain memory accesses whose KIDs is programmed in the filter logic. It should be appreciated that, although the compute device depicted in FIG. 1 includes all of the filter logics 122, 140, 172, and 182, in some embodiments the compute device 100 may include any one or more of the filter logic 122, the filter logic 140, the filter logic 172, and/or the filter logic 182.

The compute device 100 also includes the communication subsystem 190, which may be embodied as any communication circuit, device, or collection thereof, capable of enabling communications between the compute device 100 and other remote devices over a computer network (not shown). The communication subsystem 190 may be embodied as any network interface card, network adapter, network controller, host fabric interface, network coprocessor, or other component that connects the compute device 100 to a computer network. The communication subsystem 190 may be configured to use any one or more communication technology (e.g., wired or wireless communications) and associated protocols (e.g., Ethernet, InfiniBand®, Bluetooth®, Wi-Fi®, WiMAX, 3G, 4G LTE, etc.) to effect such communication. In some embodiments, the communication subsystem 190 may form a portion of an SoC and be incorporated along with the processor 110, the memory 130, the I/O subsystem 120, and/or other components of the compute device 100 on a single integrated circuit chip.

Figure 2:
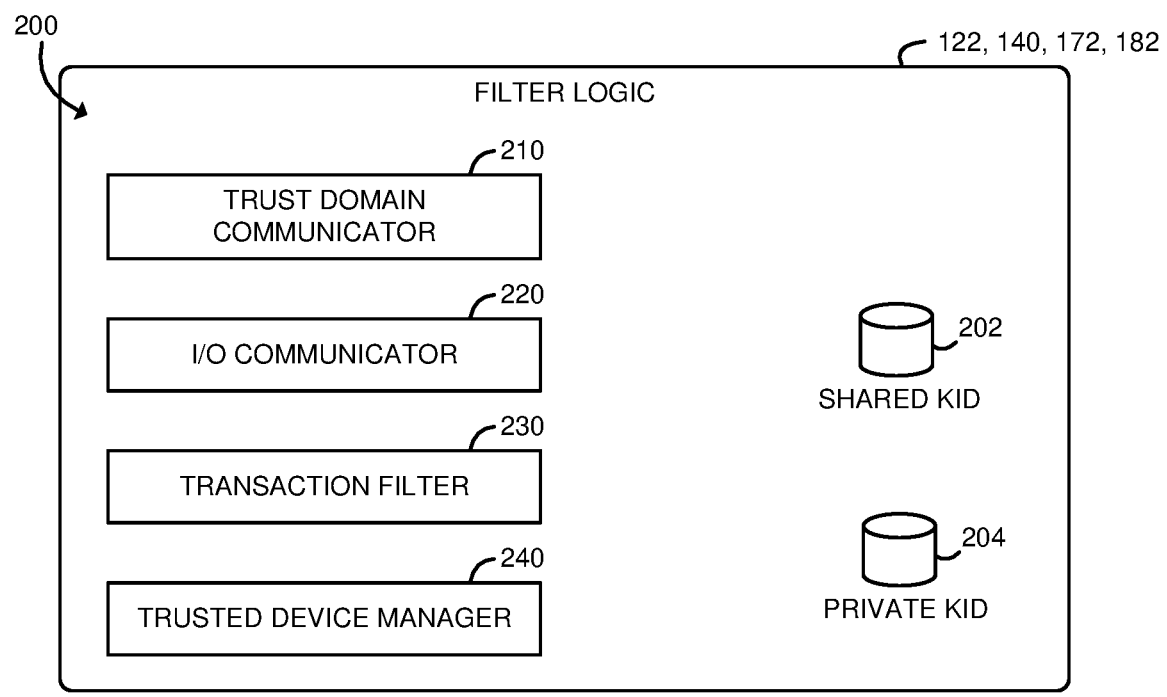
FIG. 2 is a simplified block diagram of at least one embodiment of an environment of the filter logic of FIG. 1.

Referring now to FIG. 2, in an illustrative embodiment, the filter logic 122, 140, 172, 182 of the compute device 100 establishes an environment 200 during operation. The illustrative environment 200 includes a trust domain communicator 210, an I/O communicator 220, a transaction filter 230, and a trusted device manager 240. The various components of the environment 200 may be embodied as hardware, firmware, software, or a combination thereof. As such, in some embodiments, one or more of the components of the environment 200 may be embodied as circuitry or collection of electrical devices (e.g., trust domain communicator circuitry 210, I/O communicator circuitry 220, transaction filter circuitry 230, and/or trusted device manager circuitry 240). It should be appreciated that, in such embodiments, one or more of the trust domain communicator circuitry 210, the I/O communicator circuitry 220, the transaction filter circuitry 230, and/or the trusted device manager circuitry 240 may form a portion of the filter logic 122, 140, 172, 182. Additionally, in some embodiments, one or more of the illustrative components may form a portion of another component and/or one or more of the illustrative components may be independent of one another.

The trust domain communicator 210 is configured to communicate with a trust domain to receive one or more private KIDs of the trust domain for trusted I/O devices, which is stored in a private KID database 204. In some embodiments, the trust domain communicator 210 may also be configured to communicate with a trust domain to receive a range of shared KIDs that may be used for untrusted I/O devices. However, it should be appreciated that, in some embodiments, the range of shared KIDs may be received from the processor 110 of the compute device. The range of shared KIDs is stored in a shared KID database 202. As discussed above and further below, the KID ranges are to be used by the transaction filter 230 to determine whether an I/O device (e.g., an accelerator or other I/O device) can establish a secure I/O communication with the trust domain (e.g., to access a trust domain memory).

The I/O communicator 220 is configured to communicate with an I/O device (e.g, an accelerator or other I/O device) to receive a DMA transaction generated by the I/O device that requests to access a memory (e.g., the trust domain memory or the memory outside of the trust domain). As discussed above, the DMA transaction includes a key identifier (KID) and a trusted device identifier (TID) indicator.

The transaction filter 230 is configured to filter DMA transactions received from an I/O device (e.g., an accelerator or other I/O device) based on the KID and the TID indicator associated with the DMA transaction. As discussed further below, the transaction filter 230 is configured to determine whether the DMA transaction is asserted with the TID indicator. If the TID indicator is asserted, the transaction filter 230 allows the I/O device to access the trust domain memory securely using the MKTME support. If the TID indicator was not asserted, the transaction filter 230 is further configured to determine whether the KID is within a shared KID range assigned by the trust domain. As discussed above and further below, if the KID is within a shared KID range, the transaction filter 230 allows the requesting I/O device to access the memory outside of the trust domain. However, if the KID of the data transaction received from the requesting I/O device is not within the shared KID range, the transaction filter 230 determines that the transaction is potentially malicious and blocks the data transaction. Accordingly, the transaction filter 230 is configured to monitor and filter the data transaction from the requesting I/O device (e.g, an accelerator or other I/O device) to allow access to the trust domain memory, allow access to the memory outside of the trust domain, or block the transaction as being potentially malicious.

Once the transaction filter 230 allows the I/O device (e.g, an accelerator or other I/O device) to access the trust domain memory in response to a determination that the DMA transaction is asserted with the TID indicator, the trusted device manager 240 is configured to replace the KID received from the accelerator with a private KID of the trust domain. As discussed above, the TID indicator is a flag that is asserted in the DMA transaction to indicate that the corresponding I/O device is assigned to the trust domain. For example, in some embodiments, if the TID indicator or flag is set, the trusted device manager 240 replaces one or more most significant bits (MSBs) of an address of the transaction with the assigned private KID to allow secure I/O with the trust domain.

Figure 3:
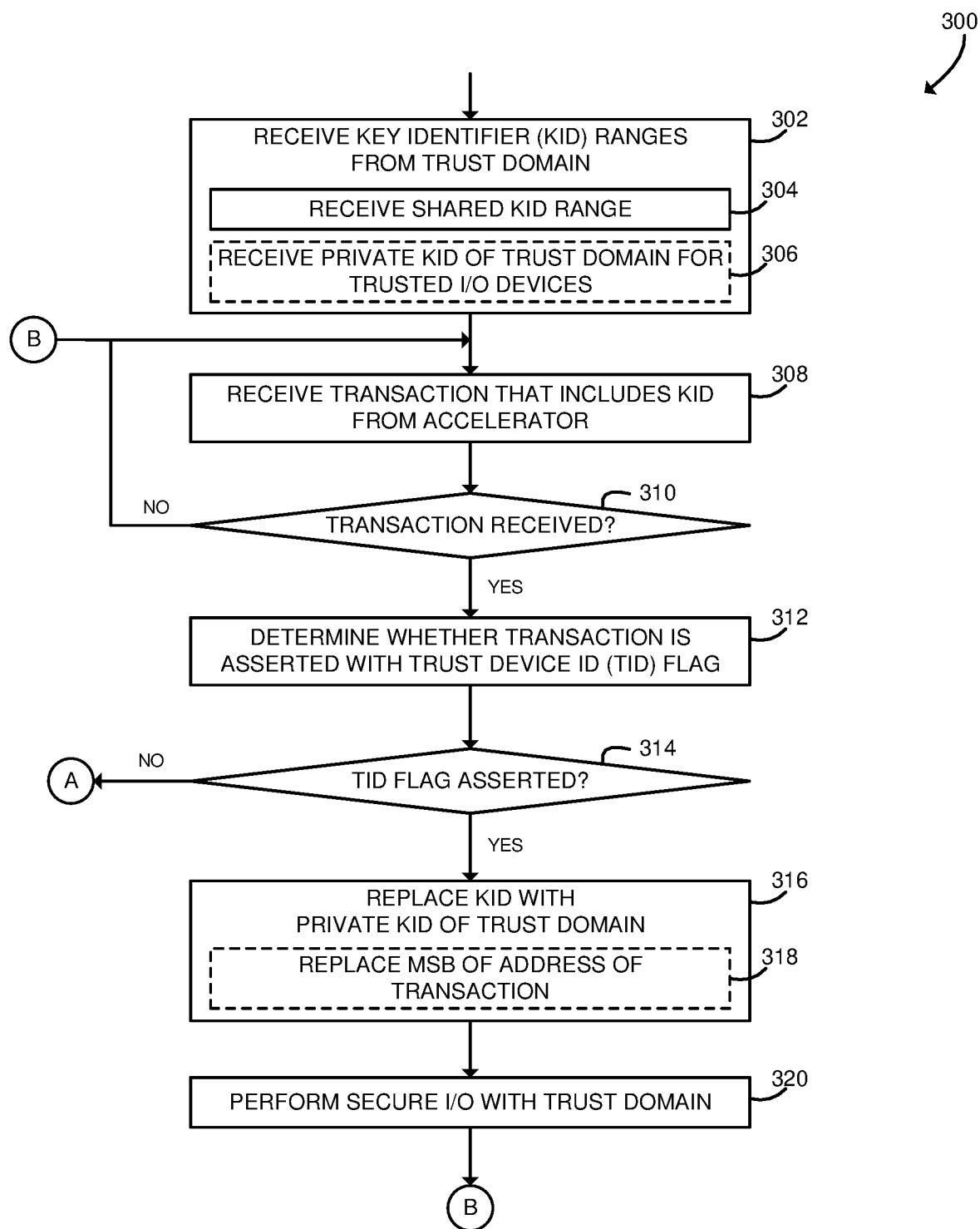
FIGS. 3 and 4 are a simplified flow diagram of at least one embodiment of a method for filtering memory access transactions from an I/O device to establish a secure data transfer between an I/O device and a trust domain that may be executed by the filter logic of the compute device of FIGS. 1 and 2.
Figure 4:
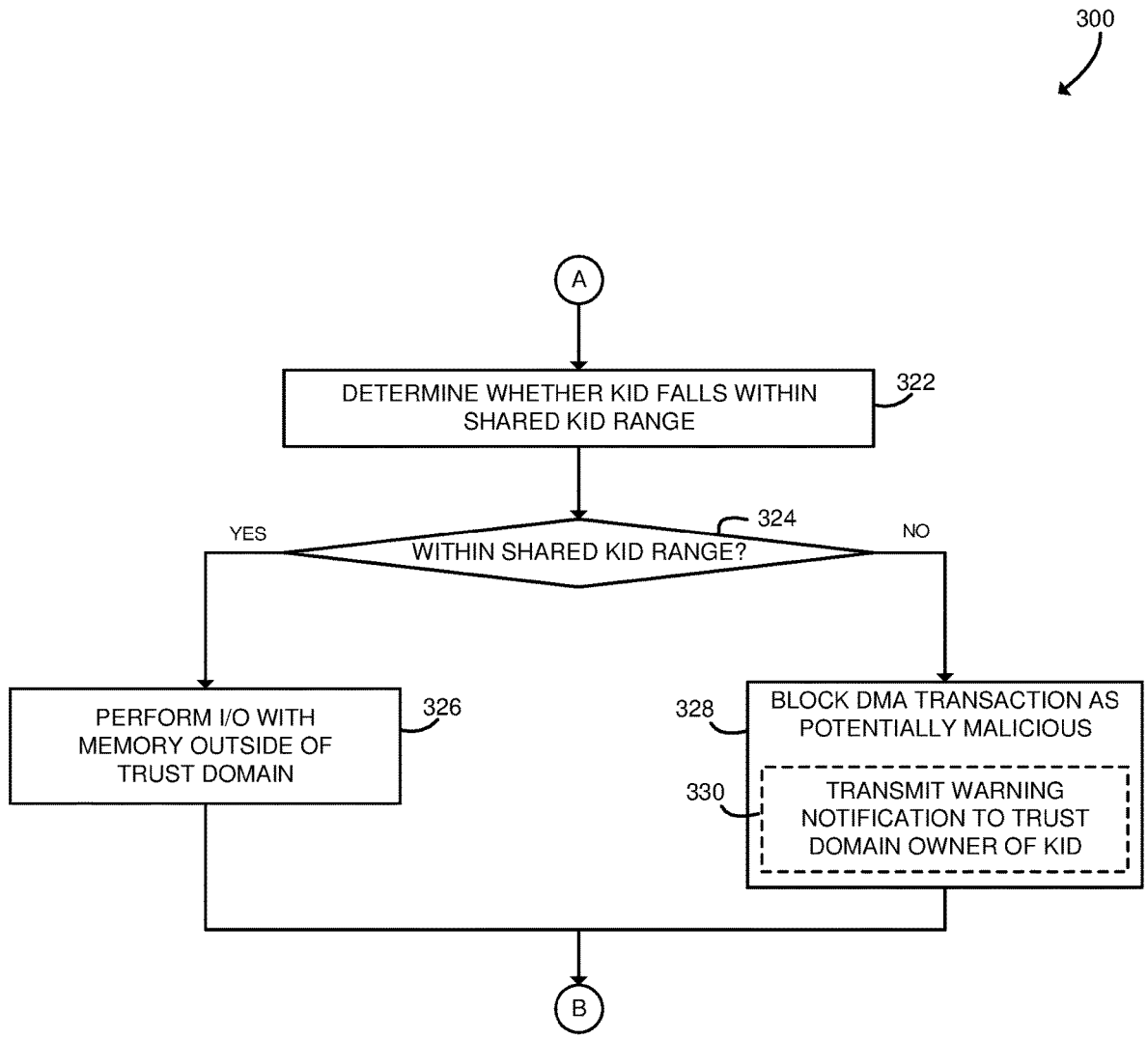

Referring now to FIGS. 3 and 4, in use, the compute device 100 may execute a method 300 for filtering memory access transactions from an I/O device to establish a secure data transfer between an I/O device and a trust domain. It should be appreciated that, in some embodiments, the operations of the method 300 may be performed by one or more components of the environment 200 of the filter logic 172 of the compute device 100 as shown in FIG. 2. The method 300 begins in block 302, in which the filter logic 172 receives a key identifier (KID) ranges from a trust domain. For example, as indicated in block 304, the filter logic 172 receives a shared KID range assigned by an operating system, trust domain, or other entity that may be used for untrusted I/O devices. In some embodiments, the filter logic 172 may also receive one or more private KIDs of the trust domain assigned to one or more trusted I/O devices as indicated in block 306.

In block 308, the filter logic 172 receives a direct memory access (DMA) transaction that includes a KID and a trust device ID (TID) indicator or flag from an accelerator 170. In block 310, the filter logic 172 determines whether a transaction has been received. If the filter logic 172 determines that a transaction has not been received, the method 300 loops back to block 308 to continue waiting for a transaction from an accelerator. If, however, the filter logic 172 determines that a transaction has been received from an accelerator, the method 300 advances to block 312.

In block 312, the filter logic 172 determines whether the transaction is asserted with the TID flag (e.g., whether the TID flag is set). As discussed above, the TID flag indicates whether the accelerator 170 is programmed to securely communicate with the processor 110. In other words, if the TID is set, the filter logic 172 is programmed with one or more private KID of the trust domain for trusted I/O devices. If the filter logic 172 determines in block 314 that the TID flag has not been asserted (i.e., the TID flag is not set), the method 300 skips ahead to block 322 in FIG. 4, which is discussed in detail below. If, however, the filter logic 172 determines that the TID flag has been asserted, the method 300 advances to block 316, in which the filter logic 172 allows the transaction to access the trust domain. To do so, in block 316, the filter logic 172 replaces the KID received from the accelerator with a private KID of the trust domain. For example, the filter logic 172 may replace one or more most significant bits (MSBs) of an address of the transaction with the assigned private KID as indicated in block 318. Subsequently, in block 320, the filter logic 172 performs secure I/O with the trust domain to access a trust domain memory using MKTME support. After performing secure I/O, the method 300 loops back to block 308 to continue processing transactions received from the accelerator.

Referring now back to block 314, if the filter logic 172 determines that the TID flag is not set, the method 300 skips ahead to block 322 of FIG. 4 to determine whether the KID included in the DMA transaction from the accelerator 170 falls within the shared KID range. As discussed above, the shared KID range is assigned by an operating system, trust domain, or other entity to be used for untrusted I/O devices to allow the untrusted I/O devices to access memory outside of any trust domain memory. If the filter logic 172 determines that the KID asserted by the accelerator is within the shared KID range assigned by the trust domain, the method 300 advances to block 326. In block 326, the filter logic 172 allows the transaction to perform I/O with the memory outside of the trust domain. Subsequently, the method 300 loops back to block 308, shown in FIG. 3, to continue waiting for a transaction from an I/O device.

Referring back to block 324, if the filter logic 172 determines that the KID asserted by the accelerator 170 is not within the shared KID range assigned by the trust domain, the method 300 advances to block 328. In block 328, the filter logic 172 blocks the DMA transaction as potentially malicious. Thus, the filter logic 172 may prevent unauthorized access to trust domain memory or other memory outside of the shared KID range. In some embodiments, as indicated in block 330, the filter logic 172 may further transmit a warning notification to a trust domain owner of the KID asserted by the accelerator 170. Subsequently, the method 300 loops back to block 308 to continue waiting for a transaction from an I/O device.

The method 300 is described with reference to the filter logic 172 and the accelerator 170. However, it should be understood that the method 300 could be additionally or alternatively performed using the filter logic 182 and the I/O device 180. Additionally, it should be appreciated that the filter logic 122, 140 may be used with an I/O device that does not have a filter logic incorporated in the I/O device itself (i.e., the accelerator 150 and the I/O device 160). In such embodiments, the filter logic 122, 140 is configured to receive all DMA transactions from any I/O devices 150, 160, 170, 180.

It should further be appreciated that, in some embodiments, the method 300 may be embodied as various instructions stored on a computer-readable media, which may be executed by the processor 110, the I/O subsystem 120, the filter logic 122, 140, 172, 182, and/or other components of the compute device 100 to cause the compute device 100 to perform the respective method 300. The computer-readable media may be embodied as any type of media capable of being read by the compute device 100 including, but not limited to, the memory 130, the data storage device 128, firmware devices, other memory or data storage devices of the compute device 100, portable media readable by a peripheral device 136 of the compute device 100, and/or other media.

EXAMPLES

Illustrative examples of the technologies disclosed herein are provided below. An embodiment of the technologies may include any one or more, and any combination of, the examples described below.

Example 1 includes a compute device for secure I/O, the compute device comprising a processor; a memory; an input/output (I/O) device; and a filer logic configured to receive a first key identifier from the processor, wherein the first key identifier is indicative of a shared memory range includes a shared key identifier range to be used for untrusted I/O devices; receive a transaction from the I/O device, wherein the transaction includes a second key identifier and a trust device ID indicator associated with the I/O device; determine whether the transaction is asserted with the trust device ID indicator indicative of whether the I/O device is assigned to a trust domain; and determine, in response to a determination that the transaction is not asserted with the trust device ID indicator, whether the second key identifier matches the first key identifier.

Example 2 includes the subject matter of Example 1, and wherein the transaction is a direct memory access transaction.

Example 3 includes the subject matter of any of Examples 1 and 2, and wherein the trust device ID indicator indicates whether the corresponding I/O device is assigned to the trust domain.

Example 4 includes the subject matter of any of Examples 1-3, and wherein the filter logic is further configured to receive a third key identifier from the trust domain, wherein the third key identifier is indicative of a private key identifier of the trust domain, wherein to perform the secure I/O with the trust domain comprises to replace, in response to determining that the trust device ID indicator is asserted, the second key identifier with the third key identifier and to perform the secure I/O with the trust domain.

Example 5 includes the subject matter of any of Examples 1-4, and wherein the filter logic is further configured to perform, in response to determining that the trust device ID indicator is asserted, a secure I/O with the trust domain.

Example 6 includes the subject matter of any of Examples 1-5, and wherein to replace the second key identifier with the third key identifier of the trust domain comprises to replace one or more most significant bits of an address of the transaction with the private key identifier.

Example 7 includes the subject matter of any of Examples 1-6, and wherein the filter logic is further configured to perform, in response to determining that the second key identifier falls within the shared key identifier range, I/O with a memory outside of the trust domain; and block, in response to determining that the second key identifier does not fall within the shared key identifier range, the transaction.

Example 8 includes the subject matter of any of Examples 1-7, and wherein the filter logic is further configured to transmit, in response to determining that the second key identifier does not fall within the shared key identifier range, a warning notification to a trust domain owner of the second key identifier.

Example 9 includes the subject matter of any of Examples 1-8, and wherein the filter logic is coupled between the processor and the I/O device.

Example 10 includes the subject matter of any of Examples 1-9, and wherein the filter logic is included in the I/O device.

Example 11 includes the subject matter of any of Examples 1-10, and wherein the filter logic is included in the processor.

Example 12 includes a method for secure I/O, the method comprising receiving, by a filter logic of a compute device, a first key identifier from a processor of the compute device, wherein the first key identifier indicative of a shared memory range includes a shared key identifier range to be used for untrusted input/output (I/O) devices; receiving, by the filter logic, a transaction from an input/output (I/O) device, wherein the transaction includes a second key identifier and a trust device ID indicator associated with the I/O device; determining, by the filter logic, whether the transaction is asserted with the trust device ID indicator indicative of whether the I/O device is assigned to a trust domain; and determining, in response to determining that the transaction is not asserted with the trust device ID indicator and by the filter logic, whether the second key identifier matches the first key identifier.

Example 13 includes the subject matter of Example 12, and wherein the transaction is a direct memory access transaction.

Example 14 includes the subject matter of any of Examples 12 and 13, and wherein the trust device ID indicator indicates whether the corresponding I/O device is assigned to the trust domain.

Example 15 includes the subject matter of any of Examples 12-14, and further including receiving, by the filter logic, a third key identifier from the trust domain, wherein the third key identifier is indicative of a private key identifier of the trust domain, wherein performing the secure I/O with the trust domain comprises replacing, in response to determining that the trust device ID indicator is asserted and by the filter logic, the second key identifier with the third key identifier and performing the secure I/O with the trust domain.

Example 16 includes the subject matter of any of Examples 12-15, and further including performing, in response to determining that the trust device ID indicator is asserted and by the filter logic, a secure I/O with the trust domain.

Example 17 includes the subject matter of any of Examples 12-16, and wherein replacing the second key identifier with the third key identifier of the trust domain comprises replacing, by the filter logic, one or more most significant bits of an address of the transaction with the third key identifier.

Example 18 includes the subject matter of any of Examples 12-17, and further including performing, in response to determining that the second key identifier falls within the shared key identifier range and by the filter logic, I/O with a memory outside of the trust domain; and blocking, in response to determining that the second key identifier does not fall within the shared key identifier range and by the filter logic, the transaction.

Example 19 includes the subject matter of any of Examples 12-18, and further including transmitting, in response to determining that the second key identifier does not fall within the shared key identifier range and by the filter logic, a warning notification to a trust domain owner of the second key identifier.

Example 20 includes one or more machine-readable storage media comprising a plurality of instructions stored thereon that, in response to being executed, cause a compute device to receive a first key identifier from the processor, wherein the first key identifier indicative of a shared memory range includes a shared key identifier range to be used for untrusted input/output (I/O) devices; receive a transaction from an I/O device, wherein the transaction includes a second key identifier and a trust device ID indicator associated with the I/O device; determine whether the transaction is asserted with the trust device ID indicator indicative of whether the I/O device is assigned to a trust domain; and determine, in response to a determination that the transaction is not asserted with the trust device ID indicator, whether the second key identifier matches the first key identifier.

The invention claimed is:

1. An apparatus comprising:
    one or more processors to:
        receive a first key identifier from the processor, wherein the first key identifier is indicative of a shared memory range includes a shared key identifier range to be used for untrusted input/output (I/O) devices;
        receive a transaction from the I/O device, wherein the transaction includes a second key identifier and a trust device ID indicator associated with the I/O device, wherein the transaction to receive the second key identifier from an accelerator associated with the one or more processors;
        determine whether the transaction is asserted with the trust device ID indicator indicative of whether the I/O device is assigned to a trust domain;
        determine, in response to a determination that the transaction is not asserted with the trust device ID indicator, whether the second key identifier matches the first key identifier;
        perform, in response to determining that the trust device ID indicator is asserted, a secure I/O with the trust domain; and
        block, in response to determining that the second key identifier fails to fall within the shared key identifier range, the transaction.

2. The apparatus of claim 1, wherein the one or more processors are further to perform, in response to determining that the trust device ID indicator is asserted, a secure I/O with the trust domain, wherein the transaction is a direct memory access transaction.

3. The apparatus of claim 1, wherein the one or more processors are further configured to receive a third key identifier from the trust domain, wherein the third key identifier is indicative of a private key identifier of the trust domain, wherein to perform the secure I/O with the trust domain comprises to replace, in response to determining that the trust device ID indicator is asserted, the second key identifier with the third key identifier and to perform the secure I/O with the trust domain.

4. The apparatus of claim 3, wherein the one or more processors are further to perform, in response to determining that the second key identifier falls within the shared key identifier range, I/O with a memory outside of the trust domain, wherein to replace the second key identifier with the third key identifier of the trust domain comprises to replace one or more most significant bits of an address of the transaction with the private key identifier.

5. The apparatus of claim 1, wherein the one or more processors are further configured to transmit, in response to determining that the second key identifier does not fall within the shared key identifier range, a warning notification to a trust domain owner of the second key identifier.

6. A method comprising:
    receiving, by one or more processors of a compute device, a first key identifier from a processor of the compute device, wherein the first key identifier indicative of a shared memory range includes a shared key identifier range to be used for untrusted input/output (I/O) devices;
    receiving, by the one or more processors, a transaction from an input/output (I/O) device, wherein the transaction includes a second key identifier and a trust device ID indicator associated with the I/O device, wherein the transaction to receive the second key identifier from an accelerator associated with the one or more processors;
    determining, by the one or more processors, whether the transaction is asserted with the trust device ID indicator indicative of whether the I/O device is assigned to a trust domain;
    determining, in response to determining that the transaction is not asserted with the trust device ID indicator and by the filter logic, whether the second key identifier matches the first key identifier;
    performing, in response to determining that the trust device ID indicator is asserted, a secure I/O with the trust domain; and
    blocking, in response to determining that the second key identifier fails to fall within the shared key identifier range, the transaction.

7. The method of claim 6, further comprising performing, in response to determining that the trust device ID indicator is asserted, a secure I/O with the trust domain, wherein the transaction is a direct memory access transaction.

8. The method of claim 6, further comprising receiving, by the one or more processors, a third key identifier from the trust domain, wherein the third key identifier is indicative of a private key identifier of the trust domain, wherein performing the secure I/O with the trust domain comprises replacing, in response to determining that the trust device ID indicator is asserted and by the filter logic, the second key identifier with the third key identifier and performing the secure I/O with the trust domain.

9. The method of claim 8, further comprising performing, in response to determining that the second key identifier falls within the shared key identifier range, I/O with a memory outside of the trust domain, wherein replacing the second key identifier with the third key identifier of the trust domain comprises replacing, by the filter logic, one or more most significant bits of an address of the transaction with the third key identifier.

10. The method of claim 6, further comprising transmitting, in response to determining that the second key identifier does not fall within the shared key identifier range and by the filter logicone or more processors, a warning notification to a trust domain owner of the second key identifier.

11. A non-transitory computer-readable medium having stored thereon instructions which, when executed, cause a computing device to perform operations comprising:
receiving a first key identifier from the processor, wherein the first key identifier indicative of a shared memory range includes a shared key identifier range to be used for untrusted input/output (I/O) devices;
receiving a transaction from an I/O device, wherein the transaction includes a second key identifier and a trust device ID indicator associated with the I/O device, wherein the transaction to receive the second key identifier from an accelerator associated with the one or more processors;
determining whether the transaction is asserted with the trust device ID indicator indicative of whether the I/O device is assigned to a trust domain; and
determining, in response to a determination that the transaction is not asserted with the trust device ID indicator, whether the second key identifier matches the first key identifier;
performing, in response to determining that the trust device ID indicator is asserted, a secure I/O with the trust domain; and
blocking, in response to determining that the second key identifier fails to fall within the shared key identifier range, the transaction.

12. The non-transitory computer-readable medium of claim 11, wherein the operations further comprise performing, in response to determining that the trust device ID indicator is asserted, a secure I/O with the trust domain, wherein the transaction is a direct memory access transaction.

13. The non-transitory computer-readable medium of claim 11, wherein the operations further comprise receiving, by the one or more processors, a third key identifier from the trust domain, wherein the third key identifier is indicative of a private key identifier of the trust domain, wherein performing the secure I/O with the trust domain comprises replacing, in response to determining that the trust device ID indicator is asserted and by the filter logic, the second key identifier with the third key identifier and performing the secure I/O with the trust domain.

14. The non-transitory computer-readable medium of claim 13, wherein the operations further comprise performing, in response to determining that the second key identifier falls within the shared key identifier range, I/O with a memory outside of the trust domain, wherein replacing the second key identifier with the third key identifier of the trust domain comprises replacing, by the filter logic, one or more most significant bits of an address of the transaction with the third key identifier.

15. The non-transitory computer-readable medium of claim 11, wherein the operations further comprise transmitting, in response to determining that the second key identifier does not fall within the shared key identifier range and by the one or more processors, a warning notification to a trust domain owner of the second key identifier.

* * * * *